Patented Aug. 16, 1949

2,479,284

UNITED STATES PATENT OFFICE 2,479,284

PREPARATION OF DERIVATIVES OF DIHYDROPYRAN

Richard R. Whetstone, Berkeley, Calif., assignor to Shell Development Company, San Francisco, Calif., a corporation of Delaware No Drawing. Application March 15, 1947, Serial No. 735,029

8 Claims. (Cl. 260—333)

1

This invention relates to a process for the preparation of compounds in the dihydropyran series of compounds. More particularly, the present invention relates to a continuous process for the preparation of compounds in the dihydropyran carboxaldehyde series of compounds by the condensation of an alpha,beta-unsaturated aldehyde under the influence of an elevated temperature in the presence of an antioxidant, or polymerization inhibitor.

One object of the present invention is an improved process for effecting the condensation, or "dimerization", of acrolein and of other, related alpha,beta-unsaturated aldehydes that are convertible by heating in the presence of a polymerization inhibitor to compounds in the dihydropyran carboxaldehyde series of compounds. Another object of the present invention is a continuous process for effecting such condensation, or "dimerization", of an alpha,beta-unsaturated aldehyde to form a dihydropyran carboxaldehyde. A related object of the invention is a process to this end that is more efficient and economical than the methods heretofore described in the prior art. A particular object of the invention comprises conditions whereunder acrolein may be caused to react to form a dihydropyran carboxaldehyde, in a continuous manner and with improved results in the nature of the yields obtainable, reduced formation of products of side reaction, and improved efficiency and economy of the process and its operation. Other objects of the invention will become apparent as the invention is described in greater detail hereinafter.

It has been discovered that an alpha,beta-unsaturated aldehyde, such as acrolein, may be caused to react to form a dihydropyran carboxaldehyde with advantages of the character above referred to, by passing a continuous liquid stream consisting of the unsaturated aldehyde containing a minor, but effective amount of a polymerization inhibitor, or antioxidant, into and through a reaction zone maintained at an elevated temperature under a pressure at least sufficient to maintain the unsaturated aldehyde in the liquid state at the temperature employed. The liquid stream is passed through the reaction zone at a rate of flow which provides a residence time of the unsaturated aldehyde in the reaction zone and at the temperature thereof sufficient to effect substantial conversion of the unsaturated aldehyde to a compound in the dihydropyran series of compounds.

The process of the present invention is generally applicable to the preparation of dihydropyran carboxaldehydes from alpha-beta-unsaturated aldehydes that are convertible by heating in the presence of a polymerization inhibitor, to compounds in the dihydropyran-2-carboxaldehyde series of compounds. The process of the present invention is particularly advantageous for the preparation of dihydropyran-2-carboxaldehydes from the aliphatic alpha,beta-unsaturated aldehydes that have a terminal methylene group in the beta position relative to the carbonyl group. Unsaturated aldehydes within this group include, among others, acrolein, methacrolein, alpha-ethylacrolein, alpha-propylacrolein, alpha - isopropylacrolein, and alpha-butylacrolein. This group of unsaturated aldehydes may be represented as having structures corresponding to the structural formula

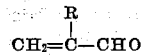

in which R represents either the hydrogen atom or an alkyl group. The process of the present invention may be employed to prepare a dihydropyran-2-carboxaldehyde from one aldehyde having the foregoing structure, or it may be employed to prepare a dihydropyran-2-carboxaldehyde from a mixture of more than one unsaturated aldehyde corresponding to the foregoing structural formula. It thus will be understood that unless qualified to the contrary, generic references herein to an alpha,beta-unsaturated aldehyde as employed in the process of the present invention are intended to include both an individual aldehyde of the present class and such mixtures of the unsaturated aldehydes of the present class that may be condensed with one another under the conditions of the process to form compounds in the dihydropyran carboxaldehyde series of compounds.

As the polymerization inhibitor, or antioxidant, there may be employed in the present process any of the class of substances known to the art as polymerization inhibitors, or antioxidants, that are effective in preventing, or minimizing, the polymerization of ethylenic compounds and that are inert under the conditions of the present process with respect to reaction with the unsaturated aldehyde and/or the products formed by the process. Among the compounds that may be employed effectively as the polymerization inhibitor in the present process are, for example, phenolic compounds, quinones, amines, nitro-aryl compounds, mercaptans, and the like. Hydroquinone is highly effective when employed as the polymerization inhibitor in the process of the present invention. In place of hydroquinone, other compounds may be employed, such as benzoquinone, naphthoquinone, phenol, a cresol, a naphthol, a xylenol, thymol, catechol, eugenol, resorcinol, pyrogallol, orcinol, guaiacol, nitrobenzene, dinitrobenzene, a nitrophenol, a nitrosophenol, or the like. Inorganic polymerization inhibitors may be employed. Inhibitors comprising an atom of a metal combined in an organic molecule also may be employed if desired. The amount of the polymerization inhibitor that is present need be only a minor amount, and generally may be less than about 10 per cent by weight of the unsaturated aldehyde. It is desired to employ an amount of the polymerization inhibitor sufficient for preventing or substantially minimizing extensive higher polymerization of the unsaturated aldehyde. In the case of hydroquinone, amounts of hydroquinone from about 0.01 per cent to about 5 per cent by weight of the unsaturated aldehyde are particularly effective for the desired purpose. When polymerization inhibitors other than hydroquinone are employed, amounts of the same general order of magnitude may be employed, although in any particular case the optimum amount may depend in part upon the particular unsaturated aldehyde and the particular polymerization inhibitor that are involved.

It advantageously has been discovered in accordance with the present invention that the condensation of an unsaturated aldehyde, such as acrolein, may be effected in a continuous and in an improved manner when the process is executed in the absence of any solvent, or dispersing medium, for the unsaturated aldehyde. The alpha, beta-unsaturated aldehydes, such as acrolein, are known to be highly reactive compounds, and to be readily convertible under various conditions to polymeric products of high molecular weight that may be resinous in character and that in any event are of largely undetermined chemical structure. It is known that at ordinary temperatures various polymerization inhibitors, or antioxidants, such as those referred to previously herein, may be employed to stabilize unsaturated aldehydes against such higher polymerization. However, it could be expected that with increasing temperature there would result increased higher polymerization of the unsaturated aldehyde, despite the presence of a polymerization inhibitor, unless some additional precaution, e. g., reduction of the volume concentration of the unsaturated aldehyde by addition of an inert diluent or solvent, were taken. Such predictions would be borne out by the observations of prior investigators that upon heating acrolein in the presence of hydroquinone and under autogenous pressure, higher polymerization, and even carbonization, occurs unless there is present a diluent such as an inert organic solvent. It nevertheless has been discovered in accordance with the present invention that the condensation of an alpha, beta-unsaturated aldehyde, when effected in a continuous manner as in the herein described process, may be caused to take place in an improved manner when there is present substantially no inert organic solvent or other diluent mixed with the unsaturated aldehyde at the temperature of the condensation reaction. In a preferred embodiment of the invention, the process thus is executed in such a manner that the liquid stream of the unsaturated aldehyde consists solely of the aldehyde (or mixture of aldehydes) and the polymerization inhibitor present in the previously indicated proportions. It is not intended to exclude as a matter of necessity the minor proportions of impurities that may be present in a commercially available preparation of an unsaturated aldehyde, since such impurities (which may include, for example, water, hydrocarbons, alcohols, etc.) generally would be present in amounts of a very few per cent of the weight of the unsaturated aldehyde, and without noticeable effect on the outcome of the present process. Taking into regard the possible presence of impurities in a commercial, or technical, grade of the unsaturated aldehyde, it is desirable that the unsaturated aldehyde constitute at least 85 per cent by weight of the liquid stream, and preferably at least 95 per cent, exclusive of the amount of polymerization inhibitor that is employed.

The process of the present invention may be executed by passing a liquid stream of the unsaturated aldehyde into and through a reaction zone, such as an elongated reaction tube, that is heated or otherwise maintained at a suitably elevated temperature. The optimum temperature for effecting the condensation of the unsaturated aldehyde to a dihydropyran carboxaldehyde in accordance with the present invention depends to a certain extent upon the unsaturated aldehyde that is involved. For example, when acrolein is the unsaturated aldehyde, particularly favorable results may be obtained when the temperature of the reaction zone is maintained within the range of from about 180° C. to about 250° C., a preferred range in this instance being from about 190° C. to about 235° C. When methacrolein is employed as the unsaturated aldehyde, a somewhat lower range of temperatures, say from about 140° C. to about 220° C., is preferable, particularly favorable results in this instance being obtainable at temperatures of from about 170° C. to about 220° C. Generally speaking, the range of from about 140° C. to about 250° C. may be employed in the process to which the present invention relates.

The rate of flow of the stream of the unsaturated aldehyde may be varied according to the other conditions of the process and the particular unsaturated aldehyde that is employed in order to obtain a satisfactory conversion of the unsaturated aldehyde to a compound in the dihydropyran carboxaldehyde series of compounds. For the purposes of the present invention, the rate of flow (in reciprocal hours) may be defined in quantitative terms by reference to the volume of liquid passed through a unit volume of the reaction zone, or space, per hour. The residence time, in hours, would be equal numerically to the reciprocal of the rate of flow. When an alpha, beta-unsaturated aldehyde of the herein defined class is employed in the present process, rates of flow from about 0.3 to about 5 reciprocal hours are generally satisfactory. Particularly advantageous results frequently may be obtained when rates of flow in excess of about 1 reciprocal hour are employed. For example, when liquid acrolein containing about 1 per cent by weight of hydroquinone is treated in accordance with the present process, yields of 3,4-dihydro-1,2-pyran-2-carboxaldehyde of 90 per cent or higher may be obtained at a temperature of 190° C. and a rate of flow equal to or greater than 1 reciprocal hour. Yields of dimethyl dihydropyran carboxaldehyde in excess of 94 per cent have been obtained from methacrolein at a temperature of 210° C. and a rate of flow of 1.25 reciprocal hours or higher.

The process of the present invention is executed with the liquid stream under sufficient pressure to maintain the unsaturated aldehyde in the liquid state. The pressure may be supplied by means of a mechanical pump which also serves to force the liquid stream through the reaction zone, or it may be supplied in other ways, for example, by means of an inert gas such as nitrogen, carbon dioxide, methane, etc., applied under pressure to the feed reservoir from which the unsaturated aldehyde is withdrawn. The pressure may be maintained by means of a pressure relief valve or other suitable means at the egress from the reaction zone, adapted to control the pressure within the desired limits. The pressure may be equal to the autogenous pressure of the liquid stream at the temperature employed or, preferably, it may be maintained above the autogenous pressure of the stream. In any given instance, the absolute pressure thus required will depend upon both the temperature and the unsaturated aldehyde that is employed. With acrolein, for example, pressures from 400 or more pounds per square inch at a temperature of about 180° C. to 600 or more pounds per square inch at a temperature of 220° C. may be employed, correspondingly higher or lower minimum pressures being desirable when other temperatures and/or other unsaturated aldehydes are employed. The maximum pressure that may be employed is dependent primarily upon the strength of the apparatus that is available, and is not critical.

Any suitable apparatus adapted to continuous operations of the herein described character may be employed in the execution of the process of the invention. A particularly suitable type of apparatus comprises an elongated reaction tube surrounded by a heating means that is adapted to maintain the temperature within the desired limits and that may be of any suitable type known in the art. The reaction tube preferably is devoid of packing materials or the like. The tube should be constructed of a material that is inert with respect to the liquid stream and its components, and that does not undesirably influence, as by catalysis, the course of the reaction. Stainless steel, glass, porcelain, and the like are satisfactory materials of construction therefor, although other metals, alloys of metals, etc., may be employed if desired.

The product of the present process may be recovered from the mixture after it leaves the reaction zone in any suitable and effective manner. Fractional distillation is a generally effective and convenient method of effecting the recovery. Other methods, including, for example, treatment with selective solvents, adsorption, methods based upon chemical reactions, and the like, may be employed if desired. The process of the present invention is particularly suited to operation in a cyclic manner. Any unsaturated aldehyde that has not reacted thus may be recovered from the mixture after it leaves the reaction tube and recycled directly through the reaction tube with the fresh feed and without necessity for further purification or the like.

The following examples will illustrate certain specific embodiments of the process of the present invention. It will be appreciated that the examples are presented with the intent to illustrate the invention, and not to limit the same other than as it is defined in the appended claims.

Examples

In the following examples, the apparatus that was employed comprised a vertically positioned reaction tube that was constructed of stainless steel and that had an internal diameter of ⅝ in. and a length of 40 in. The reaction tube was surrounded by electrical heating elements and had a ¼ inch diameter thermocouple well extending coaxially throughout its length. The free space within the tube was approximately 185 cc.

The liquid feed was forced from a reservoir by means of nitrogen gas under pressure, through a preheater, and into the lower end of the tube. The liquid mixture leaving the tube was withdrawn through an adjustable pressure-relief valve to a water-cooled condenser at atmospheric pressure.

In each experiment, the tube first was heated to the desired temperature, and flushed out with nitrogen gas at 50 to 100 pounds per square inch pressure. The liquid feed was fed in until the system was at the desired pressure, and the pressure-relief valve then was opened and the product withdrawn at the desired rate from the reaction tube.

Example I

A stream of liquid acrolein containing 1 per cent by weight of hydroquinone was passed through the reaction tube at a temperature of 190° C., a flow rate of 2.1 reciprocal hours, and under a pressure of 480 to 580 pounds per square inch. After a steady state was established, the mixture leaving the tube was collected and fractionally distilled. 3,4-Dihydro-1,2-pyran-2-carboxaldehyde was recovered in a yield of 92 per cent based upon the acrolein consumed. Of the acrolein applied, 75.5 per cent was recovered from the distillation in a purity suitable for recycling through the process.

Example II

A stream of liquid methacrolein containing 1 per cent by weight of hydroquinone was passed through the reaction tube at a temperature of 210° C. at a rate of flow of 1.28 reciprocal hours and under a pressure of 600 pounds per square inch. After a steady state was established, the mixture leaving the tube was collected and fractionally distilled. Dimethyl-3,4-dihydro-1,2-pyran carboxaldehyde was recovered in a yield of 94.6 per cent based on the methacrolein consumed and a conversion of 75.7 per cent based on the methacrolein applied.

Example III

A stream of liquid acrolein containing 1 per cent by weight of hydroquinone was passed through the reaction tube at a temperature of 210° C., a rate of flow of 4.18 reciprocal hours, and a pressure of 600 to 700 pounds per square inch. Upon collection and distillation of the mixture leaving the tube after attainment of a steady state of reaction, 3,4-dihydro-1,2-pyran-2-carboxaldehyde was recovered in a yield of 88.2 per cent. Of the acrolein applied, 88 per cent was recovered in a purity suitable for direct recycling through the reaction tube.

This application is a continuation-in-part of my application, Serial No. 713,455, filed December 2, 1946.

I claim as my invention:

1. A continuous, cyclic process of preparing a dihydropyran carboxaldehyde comprising passing a continuous stream consisting of liquid acrolein containing from about 0.01 to about 5 per cent, by weight, of hydroquinone through an elongated reaction zone at a temperature from about 190° C. to about 235° C. at a rate of flow of from about 0.3 to about 5 reciprocal hours, recovering unreacted acrolein and the dihydropyran carboxaldehyde from the resultant mixture, and recycling the unreacted acrolein through the reaction zone with fresh feed.

2. A continuous process of preparing a dihydropyran carboxaldehyde comprising passing a continuous stream consisting of liquid methacrolein containing from about 0.01 to about 5 per cent, by weight, of hydroquinone through an elongated reaction zone at a temperature from about 170° C. to about 220° C. at a rate of flow of from about 0.3 to about 5 reciprocal hours.

3. A continuous process of preparing a dihydropyran carboxaldehyde comprising passing a continuous stream consisting of liquid acrolein containing from about 0.01 to about 5 per cent, by weight, of hydroquinone through an elongated reaction zone at a temperature from about 190° C. to about 235° C. at a rate of flow of from about 0.3 to about 5 reciprocal hours.

4. A continuous process of preparing a dihydropyran carboxaldehyde comprising passing a continuous stream consisting of liquid acrolein containing a minor amount of a polymerization inhibitor through an elongated reaction zone at a temperature of from about 180° C. to about 250° C. at a rate of flow in excess of about 1 reciprocal hour under a pressure greater than the autogenous pressure of the acrolein at the temperature employed.

5. A continuous process of preparing a dihydropyran carboxaldehyde comprising passing a continuous stream consisting of liquid methacrolein containing a minor amount of a polymerization inhibitor through an elongated reaction zone at a temperature of from about 140° C. to about 220° C. at a rate of flow in excess of about 1 reciprocal hour under a pressure greater than the autogeneous pressure of the methacrolein at the temperature employed.

6. A continuous process of preparing a dihydropyran carboxaldehyde comprising passing a continuous liquid stream comprising as its only active ingredients acrolein and a minor amount of polymerization inhibitor, wherein the acrolein constitutes a proportion of at least 85 per cent by weight of the liquid stream exclusive of the weight of polymerization inhibitor, through an elongated reaction zone maintained at a temperature of from about 180° C. to about 250° C. at a pressure greater than the autogenous pressure of the liquid stream at the temperature employed.

7. A continuous process of preparing a dihydropyran carboxaldehyde comprising passing a continuous liquid stream consisting of an aliphatic alpha, beta unsaturated aldehyde having a terminal methylene group in the beta position relative to the carbonyl groups, and a minor amount of a polymerization inhibitor, into and through a reaction zone at a temperature of from about 140° C. to about 250° C. at a rate of flow of from about 0.3 to about 5 reciprocal hours under a pressure greater than the autogenous pressure of the liquid stream at the temperature employed.

8. A continuous process of preparing a dihydropyran carboxaldehyde comprising passing a continuous liquid stream comprising as its only active ingredients an aliphatic alpha, beta unsaturated aldehyde having a terminal methylene group in the beta position relative to the carbonyl group, in the presence of a minor amount of a polymerization inhibitor, in said stream the unsaturated aldehyde constituting a proportion of at least 85 per cent by weight thereof, exclusive of the weight of polymerization inhibitor, into and through a reaction zone at a temperature of from about 140° C. to about 250° C. at a rate of flow in excess of about 0.3 reciprocal hour.

RICHARD R. WHETSTONE.

REFERENCES CITED

The following references are of record in the file of this patent:

UNITED STATES PATENTS

| Number | Name | Date |
|---|---|---|
| 2,105,284 | Groll | Jan. 11, 1938 |
| 2,150,137 | Swallen | Mar. 7, 1939 |

OTHER REFERENCES

Moreau et al., Chemical Abstracts, vol. 17, 1923, page 2105.

Moreau et al., Chemical Abstracts, vol. 19, 1925, pages 1125–1127.